Patented Sept. 6, 1932

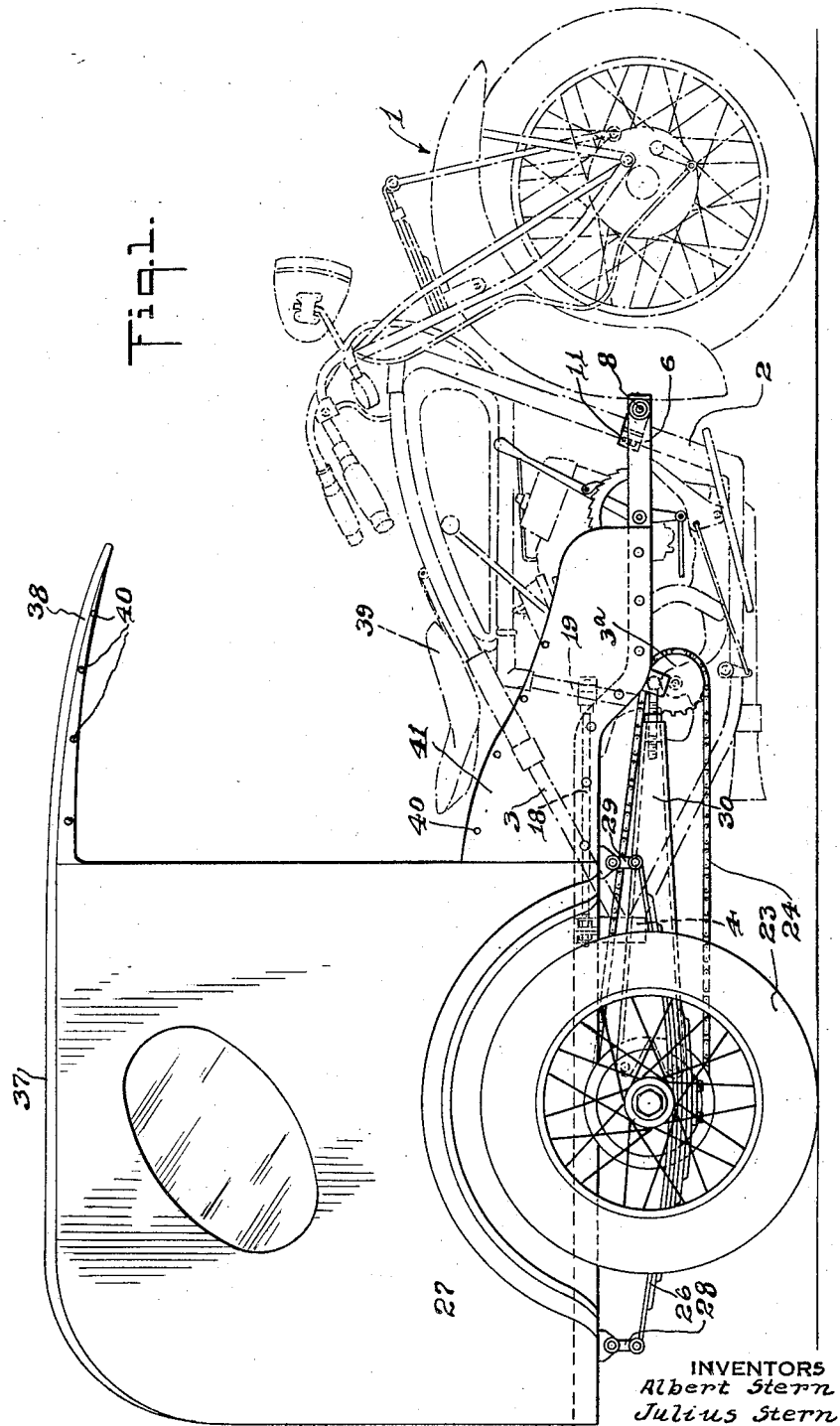

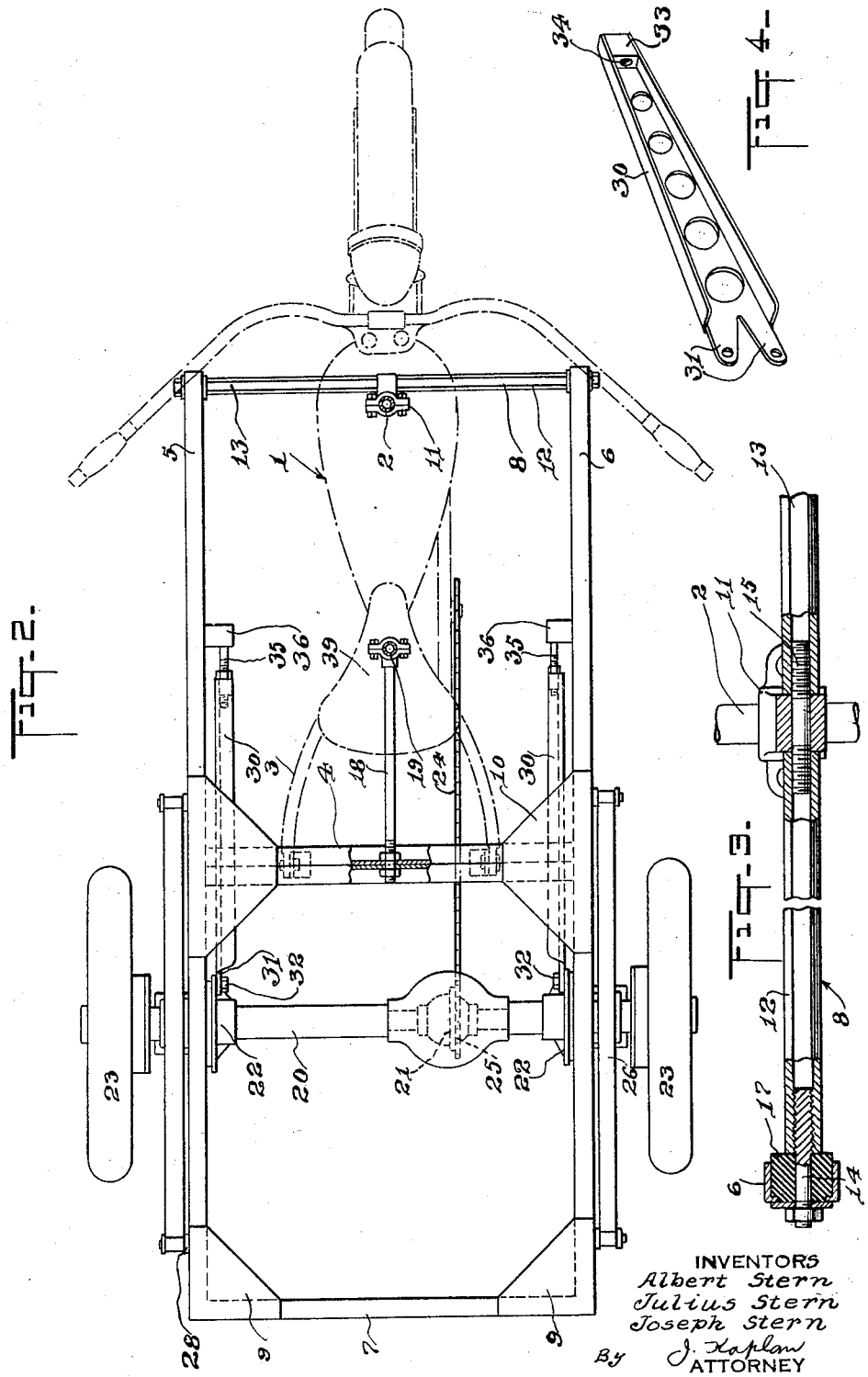

1,876,155

UNITED STATES PATENT OFFICE

ALBERT STERN, JULIUS STERN, AND JOSEPH STERN, OF NEW YORK, N. Y., ASSIGNORS, BY MESNE ASSIGNMENTS, TO INDIAN MOTOCYCLE COMPANY, OF SPRINGFIELD, MASSACHUSETTS, A CORPORATION OF MASSACHUSETTS

DELIVERY CAR

Application filed February 28, 1930. Serial No. 432,144.

This invention relates to motor cars and more particularly to the attachment for converting a motorcycle into a three wheeled unit or delivery car.

The principal object of the invention is to provide an auxiliary attachment in the form of body and chassis which can easily and simply be attached to a standard motorcycle and convert the motorcycle into a three wheeled unit or delivery car.

Another object of the invention is to transform an ordinary standard motorcycle into a delivery car for delivering freight or baggage by removing the rear wheel of the motorcycle and affixing a body and chassis to the frame of the motorcycle.

Another object of the invention is to provide an auxiliary attachment to a motorcycle in the form of a body and chassis including two wheels and a differential and means to drive the differential by a chain operable connected to a driving sprocket of the motorcycle.

Another object of the invention is to provide efficient means to attach the chassis and body to the motorcycle in such a manner so as to withstand the ordinary stress and strains of road shock.

Still another object of the invention is to provide a combined motorcycle, delivery or pleasure car including a body for holding passengers or the articles to be delivered, said body having an extended portion of the roof which covers the seat of the driver.

Other objects of the invention will appear as the disclosure progresses. The drawings are intended merely to indicate a possible embodiment of the invention. It is obvious that the actual needs of manufacture may necessitate certain mechanical changes. It is therefore not intended to limit the invention to the embodiment illustrated but rather to define such limits in the appended claims. For a more general understanding of the invention attention is called to the drawings. In these drawings like reference characters denote like parts throughout the specification.

Figure 1 is a side view of the delivery car attached to a motorcycle.

Figure 2 is a top view of the chassis with the body removed.

Figure 3 is a view partly in section of the front cross member of the chassis.

Figure 4 is a perspective view of the truss member.

Before proceeding to a more detailed description of the invention, it must be clearly understood that although the attachment herein illustrated is shown in connection with an Indian motorcycle, the same can be efficiently applied, with very slight modifications to any other make of motorcycle.

Referring now to the drawings in detail numeral 1 designates a standard motorcycle, 2 the usual front frame, and 3 the rear fork which serves as a bearing for the usual rear wheel. For the purpose of this invention, however, the rear wheel is removed and the fork attached directly to the central cross member 4 of the body chassis. The chassis includes side members 5 and 6, a rear member 7 and a front cross member 8. The rear member 7 and the cross member 4 are securely fastened to the side members 5 and 6 by the gusset plates 9 and 10. The front cross member 8 is attached in the center to the front frame 2 by the clamp 11. The ends of the member 8 are fastened to the ends of the side members 5 and 6 as shown in Figure 2.

The member 8 comprises hollow sleeves 12 and 13 into the ends of which are screwed bolts 14 and 15. The bolts 14 are adapted to be connected to the frames 5 and 6 and the bolt 15 connects with the clamp 11. To absorb the vibration of the chassis frame, insulating material 17 of rubber or the like is interposed between the shank of the bolts 14 and the members 5 and 6 as shown in Figure 3. As noted when the bolts and sleeves are made tight a unitary and rigid structure will be formed which will firmly keep the front end of the chassis firmly attached to the frame 2 of the motorcycle. In addition to the above mentioned means for tieing the chassis and motorcycle together another tie rod 18 is used to fasten the rear vertical member 19 of the front frame 2 to the cross member 4 of the chassis.

The "rear end" of the chassis consists of the axle housing 20, the differential 21 and the truss brackets 22. Numeral 23 designates the usual wheels for supporting the chassis. Numeral 24 represents the driving chain which engages with the sprocket 3ᵃ of the motorcycle and the sprocket 25 of the differential. Numeral 26 designates the usual springs for supporting the car body 27 by the spring shackles 28 and 29. Numeral 30 designates a set of truss members for transmitting the forward momentum of the "rear end" direct to the chassis and for regulating the slack of the driving chain 24. As shown in Figure 2 the rear ends 31 of the truss members are attached to the truss brackets 22 by the bolts 32. The front ends of the truss members include a block 33 having a tapped hole 34 which engages with an adjusting rod 35 pivoted to the front shackles 36 attached to the chassis members 5 and 6. As shown in Figure 1 the roof 37 of the body has an extension 38 covering the driver's seat 39 so as to protect the driver from the elements and board members 41 extend forwardly from the sides of the body 27 and are attached to the side members 5 and 6 of the chassis on both sides of the driver's seat. Water-proof side curtains can be attached to the buttons 40 and thereby form a partly enclosed compartment for the driver.

From the above it will be seen that the transformation of a motorcycle into a delivery car or three wheel unit can easily and quickly be made without any alteration in the frame of the motorcycle by simply removing the rear motorcycle wheel, attaching the motorcycle frame to chassis of the car and connecting a driving chain from the motorcycle driving sprocket to the differential of the chassis.

Having described our invention, we claim:—

1. The combination of a motorcycle including a front frame, a rear fork and a driving sprocket, of a delivery car chassis, said chassis having a central cross member and two side members, said rear fork attached to said central cross member, connections between the front of the chassis and the front frame of the motorcycle, said chassis including an axle and a differential, a wheel at each end of said axle and adapted to rotate therewith, and a driving chain engaging said differential and said driving sprocket.

2. In a device of the class described, the combination of a motorcycle and a delivery car chassis, said motorcycle including a front frame and a rear fork, said chassis including two side members, a front cross member and a central cross member, means for tieing the said front cross member of the chassis to the front frame of the motorcycle, means including a longitudinal rod for tieing the front frame of the motorcycle to the said central member of the said chassis and means for tieing the said motorcycle rear fork to the said central member of the chassis.

3. In a device of the class described, the combination of a motorcycle and a delivery car chassis, said motorcycle including a front frame and a rear fork, said chassis including two side members, a front cross member and a central cross member, means for tieing the said front cross member of the chassis to the front frame of the motorcycle, and means for tieing the said motorcycle rear fork to the said central member of the chassis.

4. In a delivery car of the class described in combination, a rear axle housing, truss members attached to said axle housing at one end and the opposite end attached to said chassis, and means to adjust the length of said truss members, said truss members including a body portion and two flanged portions, and a block having a tapped hole fastened at one end of said truss members.

5. The combination of a motorcycle including a driver's seat, a delivery car body and chasis attached to said motorcycle, said body having an overhanging roof portion which extends over the said driver's seat, the front of said chassis being reinforced by board members, said board members attached to said chassis on both sides of the driver's seat and underneath said overhanging roof member.

6. In a motor vehicle, the combination of a motorcycle having a front frame, an engine and a rear fork, a chassis including front, central and rear cross members and side members, means for securing the central cross member of said chassis to the rear fork of said motorcycle, means for securing the front cross member of said chassis to said motorcycle front frame, a pair of wheels for said chassis, and driving connections between the motorcycle engine and said wheels.

7. In a motor vehicle, the combination of a motorcycle having a front frame, an engine and a rear fork, a chassis including side members, means for securing the rear fork of the motorcycle to said chassis between the side members thereof, means for securing the side members to the motorcycle front frame, a rear axle supported on said chassis, springs between said rear axle and said chassis, wheels on said rear axle, and driving connections between said rear axle and the motorcycle engine.

8. In a motor vehicle, the combination of a motorcycle having a front frame, an engine and a rear fork, a chassis including side members, means for securing the rear fork of the motorcycle to said chassis between the side members thereof, a cross member secured to the motorcycle front frame, and connections between each of said side members and the corresponding end of said cross member.

9. In a motor vehicle, the combination of a motorcycle having a front frame, an engine and a rear fork, a chassis including side members, means for securing the rear fork of the motorcycle to said chassis between the side members thereof, a cross member secured to the motorcycle front frame, connections between each of said side members and the corresponding end of said cross member, and shock-absorbing means in said connections.

10. In a motor vehicle, the combination of a motorcycle having a front frame, an engine and a rear fork, a chassis including side members, means securing the rear fork of the motorcycle to said chassis between the side members thereof, means for securing the side members to the motorcycle front frame, a rear axle supported on said chassis, wheels on said rear axle, a differential in said rear axle, and driving connections between said differential and the motorcycle engine.

11. In a motor vehicle, the combination of a motorcycle having a front frame, an engine, a chassis having side members secured to the motorcycle front frame, an axle housing mounted on the chassis, an axle journalled therein, wheels on said axle, driving connections between said axle and the motorcycle engine, and members connected at one end to said axle housing and at the other end to said chassis side members for transferring road shocks from said axle housing to said chassis.

In testimony whereof we affix our signatures.

ALBERT STERN.
JOSEPH STERN.
JULIUS STERN.